United States Patent Office 3,248,222
Patented Apr. 26, 1966

3,248,222
ENHANCING THE EFFECTIVENESS OF 2-MERCAPTOIMIDAZOLE COMPOUNDS WHEN ORALLY ADMINISTERED TO MEAT-PRODUCING RUMINANTS
Wise Burroughs, Ames, Iowa, assignor to Iowa State University Research Foundation, Inc., Ames, Iowa, a corporation of Iowa
No Drawing. Filed Aug. 21, 1961, Ser. No. 132,559
9 Claims. (Cl. 99—2)

This application relates to the administration of 2-mercaptoimidazole compounds to meat-producing ruminants, and more particularly to the enhancement of the effectiveness of such compounds when orally administered for the purpose of promoting growth and feed utilization. The invention also relates to compositions which are especially adapted for use in the method. The invention has particular utility with immature, growing beef cattle and sheep. Beef cattle and sheep are the principal meat-producing ruminants in the United States.

It has been found that 2-mercaptoimidazole compounds, such as 1-methyl 2-mercaptoimidazole, can be utilized as growth promotants for beef cattle and sheep. When these compounds are orally administered in proper amounts, a significant increase in rate of weight gain and in feed efficiency can be obtained.

The method of employing a 2-mercaptoimidazole compound in combination with an estrogenic substance, such as diethylstilbestrol, is described in copending application Serial No. 793,668, filed February 17, 1959. A method for extending and improving the benefits of 2-mercaptoimidazole administration is set out in my copending application Serial No. 132,558, filed August 21, 1961, entitled "Administration of 2-Mercaptoimidazole Compounds to Meat-Producing Ruminants." The last cited application relates particularly to the control of vitamin A activity in the diet of the animals over the course of the 2-mercaptoimidazole administration.

As already indicated, this invention has as its particular object the enhancement of the effectiveness of a 2-mercaptoimidazole compound when orally administered to meat-producing ruminants. More specifically, it is desired to obtain a substantial increase in rate of weight gain and in feed efficiency over that which can be obtained with a 2-mercaptoimidazole compound. Further objects and advantages will be indicated in the following detailed specification.

This invention is based in part on the discovery that thyroxine-active substances when administered in controlled amounts are capable of enhancing the effectiveness of 2-mercaptoimidazole compounds. This is believed to be a synergistic effect since the increase in rate of weight gain and in feed efficiency cannot be accounted for by the individual effects of the 2-mercaptoimidazole compound and thyroxine-active substance. In order to achieve the desired results, however, it is necessary to limit the amount of thyroxine-active material to a critically low level in relation to the amount of 2-mercaptoimidazole compound.

In practicing the present invention, it is desirable to limit the amount of thyroxine-active substance to from .0002 to .0075 milligram (mg.) of thyroxine (or a quantity providing this amount of thyroxine activity) per mg. of the 2-mercaptoimidazole compound. Preferably, the quantity of thyroxine-active substance should provide from .0005 to .0025 milligram of thyroxine activity per milligram of 2-mercaptoimidazole compound.

For the purposes described, thyroxine itself may be employed, or other thyroxine active material, such as a thyroprotein like iodinated casein. The selection of the thyroxine-active material will depend primarily on the relative cost, and it will usually be desirable to utilize the substance providing the greatest amount of activity at the least cost. Because of their availability and low cost, thyroproteins are particularly desirable. For example, the iodinated casein sold under the trade name Protamone is suitable. This product may contain an amount of thyroxine activity equal to from 1 to 3% of its weight, and is commonly manufactured and sold with a 1% level of activity.

The 2-mercaptoimidazole compound can be selected from the group consisting of 2-mercaptoimidazole and 1-alkyl 2-mercaptoimidazoles wherein the alkyl group contains from one to five carbon atoms. One preferred carbon atom is 1-methyl 2-mercaptoimidazole. Other compounds having similar properties when employed for the purpose of the present invention are 2-mercaptoimidazole, 1-ethyl 2-mercaptoimidazole, 1-propyl 2-mercaptoimidazole, 1-butyl 2-mercaptoimidazole, and 1-isopentyl 2-mercaptoimidazole.

The amount of the 2-mercaptoimidazole compound to be employed can be substantially as in the prior practice. Normally more than 10 mg. but less than 150 mg. of the 2-mercaptoimidazole compound will be orally administered to the ruminant per 100 pounds of body weight per 24 hours. The preferred amount will be within the range from 25 to 100 mg. of the 2-mercaptoimidazole compound per 100 pounds of body weight per 24 hours. With animals of the size normally being fattened, the amount of the 2-mercaptoimidazole compound will range from 200 to 1,000 milligrams per animal per day for beef cattle, and from 20 to 100 mg. per animal per day for sheep.

In order to achieve the benefits of the present invention, it will usually be desirable to administer the combination of the thyroxine-active material and the 2-mercaptoimidazole compound for at least 30 days, and preferably for a period of at least 60 days. An estrogen such as diethylstilbestrol may also be administered to the ruminants as described in the cited application Serial No. 793,668.

Where it is desired to administer to cattle the combination of the 2-mercaptoimidazole compound and the thyroxine active material, either with or without an estrogenic substance, for periods of longer than 60 days, it is preferable to limit the intake of vitamin A activity during the first 60 days, as described in the cited application entitled "Administration of 2-Mercaptoimidazole Compounds to Meat-Producing Ruminants," and then after the first 60 day period to incorporate a controlled amount of true vitamin A in the ration. The latter procedure is also described in the cited application. More specifically therefore, at a later stage in the feeding of beef cattle and sheep it will probably be desirable to employ a feed material contining from .0002 to .0075 mg. of thyroxine activity together with 2 to 450 International Units (I.U.) of true vitamin A per milligram of the 2-mercaptoimidazole compound. A preferred formulation will contain from 6 to 120 I.U. of the vitamin A and from .0005 to .0025 mg. of thyroxine activity per milligram of the 2-mercaptoimidazole compound.

The foregoing quantities of the 2-mercaptoimidazole compound, the thyroxine-active substance, and the vitamin A may be conveniently administered by incorporating them in feed material for the animals. For example, the substances may be fed as ingredients in a beef cattle or sheep protein feed supplement. Such supplements are commonly fed to beef cattle in amounts of 1 to 2 pounds per day, while sheep may receive from 0.1 to 0.2 pound per day. Depending somewhat on the amount fed, such protein supplements can contain from 150 to 1,000 mg. of the 2-mercaptoimidazole compound per pound, and corresponding amounts of the other ingredients. If desired the active substances can be included in a complete ration for the beef cattle or sheep. Protein supplements will usually be composed principally of a feed material having a relatively high protein content, such as soybean meal, cottonseed meal, and the like, but this type of feed material is not essential as a means of administering the active substances. Where the substances are included in the complete ration, the concentrations in the ration can usually be computed with sufficient accuracy on the assumption that the animals will eat about 3% of their weight per day.

The following examples illustrate the method and feed compositions of this invention in greater detail.

*Example 1*

Thoroughly mix the dry powder of 1,000 grams of 1-methyl 2-mercaptoimidazole and 2 grams of thyroxine with about 8 pounds of soybean meal to make 10 pounds of a premix suitable for incorporating in protein supplemental feeds for cattle and sheep. The premix thus compounded will contain 100 grams of the 1-methyl 2-mercaptoimidazole compound and 0.2 gram of thyroxine per pound of the product.

The premix product prepared as described above (which contains both 1-methyl 2-mercaptoimidazole and thyroxine in the proportion of 500 parts of the 1-methyl 2-mercaptoimidazole compound per part of the thyroxine) can then be used to prepare a feed ration or protein supplemental feed for administration to beef cattle. For example, 10 pounds of the premix can be mixed with 1,990 pounds of beef cattle protein supplemental ingredients. Such ingredients are composed of protein-rich components of vegetable origin such as cottonseed meal, wheat middlings, soybean meal and linseed meal. After the premix has been thoroughly distributed throughout the protein supplemental ingredients a ton of protein supplemental feed utilizable in accordance with the present invention will be obtained. This material will contain 500 mg. of 1-methyl 2-mercaptoimidazole and one mg. of thyroxine per pound, and is well adapted for use as a finishing-type protein supplemental feed in the feeding of beef cattle for market.

*Example 2*

Either cattle or sheep being finished for market are suitable animals in practicing this invention. By way of specific example, yearling cattle weighing an average of 900 pounds can be fed for a period of 60 days on a finishing ration containing one pound of the protein supplemental feed described in Example 1. This will mean that each animal will be receiving 500 milligrams of 1-methyl 2-mercaptoimidazole and one milligram of thyroxine per 24 hours. Liveweight gain will be improved over that which would have been obtained had only the 1-methyl 2-mercaptoimidazole compound been included in the protein supplement feed. The weights of the cattle at the end of the 60 day period might average 1,115 pounds which is approximately 15 pounds more than the cattle would have weighed had the supplement contained only the 1-methyl 2-mercaptoimidazole compound and not the combination including thyroxine.

Sheep weighing initially 92 pounds per animal and fed finishing ration including 0.1 pound per animal per day of the protein supplemental feed described in Example 1 might weigh at the end of 30 days 107 pounds per animal. This is approximately two pounds more than the sheep would have weighed had not the combination been fed and instead only the 1-methyl 2-mercaptoimidazole compound had been included in the protein supplemental feed.

*Example 3*

The powder form of seven hundred grams of 1-methyl 2-mercaptoimidazole and one hundred grams of a thyroprotein containing one percent thyroxine activity is thoroughly blended in approximately 8 pounds of wheat middlings to make 10 pounds of a first premix. The premix thus compounded will contain 70 grams of the 1-methyl 2-mercaptoimidazole compound and 10 grams of thyroprotein having 0.1 gram of thyroxine activity per pound of the product.

This premix product prepared as described above can then be used to prepare a first feed ration or protein supplemental feed for administration to beef cattle or sheep during the first phase of a feeding regimen comprising a feeding period of 30 to 60 days. For example, 10 pounds of the premix can be mixed with 1,990 pounds of protein supplemental ingredients which are essentially devoid of caroten and vitamin A. Such ingredients are principally composed of vegetable protein sources such as soybean meal, cotton seed meal, linseed meal, wheat middlings, etc. After the premix has been thoroughly distributed throughout the ingredients, a ton of protein supplemental feed utilizable in the first feeding period of this invention will be obtained. This material will contain 350 milligrams of 1-methyl 2-mercaptoimidazole and 0.5 milligram of thyroxine activity per pound and the material will be essentially devoid of vitamin A or vitamin A activity in the form of carotene.

During the second feeding period extending over an additional period of 30 to 60 days, the feed ration or protein supplement fed to beef cattle or sheep is prepared similar to that used in the first feeding period except that a controlled amount of true vitamin A is also incoporated. For example, a second protein supplemental feed is fed during this second feeding period by first preparing a second premix. Seven hundred grams of 1-methyl 2-mercaptoimidazole, 100 grams of a thyroprotein containing one percent thyroxine activity and 8 million International Units of vitamin A are thoroughly dispersed on about 8 pounds of soybean meal to make 10 pounds of a second premix. This 10 pounds of second premix is thoroughly mixed with 1,990 pounds of other protein supplemental ingredients as described above to make one ton of protein supplemental feed suitable for feeding during this second feeding period.

*Example 4*

By way of specific example, yearling cattle weighing an average of 800 pounds initially can be first fed for 60 days a ration which includes the first protein supplemental feed described in Example 3. This first supplemental feed can be fed at the rate of 2 pounds per day per animal in supplying 700 milligrams of 1-methyl 2-mercaptoimidazole and one milligram of thyroxine activity per 24 hours. In addition to this first described supplement, the cattle during this first 60 day period can be full-fed ground ear corn (about 20 pounds per animal daily) and from none to 3 pounds of hay daily per animal such that the total ration will furnish the vitamin A and other nutrient needs of cattle but at the same time will not supply greatly excessive amounts of vitamin A in relation to commonly established body requirements (0.7 mg. carotene per pound of air dry ration). The rate of weight gain will be substantially higher during this initial 60-day period than would have occurred had only the 1-methyl 2-mercaptoimidazole compound been included in the protein supplemental feed. The weights of the cattle at the end of the 60-day period might average 1,015 pounds which is approximately 15 pounds more than the cattle would have weighed had the supplement contained only the 1-methyl-2-mercaptoimidazole compound and not the combination including thyroprotein fed in conjunction with this adequate ration with a controlled amount of vitamin A activity in the form of carotene.

During a second feeding period of 60 days, a second protein supplemental feed as described in Example 3 can be fed at the rate of 2 pounds per animal per day. This second protein supplemental feed will supply 700 milligrams of 1-methyl 2-mercaptoimidazole, one milligram of thyroxine activity and 8,000 I.U. of true vitamin A per 24 hours to each animal. In addition to this second described supplement, the cattle during this second period should be continued on a full-feed of ground corn and limited hay as described above. The rate of weight gain will also be substantially higher during this second 60-day period than would have occurred had only the 1-methyl 2-mercaptoimidazole compound been included in the protein supplemental feed. The weights of the cattle at the end of this second feeding period might be 1,205 pounds as compared with 1,175 pounds for similar animals which had received only the 1-methyl 2-mercaptoimidazole compound and not the combination thyroprotein, vitamin A and 1-methyl 2-mercaptoimidazole compound.

Sheep weighing about 80 pounds should be fed rations somewhat similar to those described for cattle including the first and second described protein supplements fed respectively in periods 1 and 2 except the daily amounts of all feeds fed per animal should be about 10 percent that fed to cattle due to the smaller size of sheep. Also the length of the two feeding periods for sheep should be reduced to 30 days each rather than 60 days each as in the case of cattle. The final market weights of sheep receiving the 1-methyl 2-mercaptoimidazole compound and the thyroprotein during both periods might be 109 pounds as compared to 105 pounds had the sheep received only the 1-methyl 2-mercaptoimidazole compound and not the thyroxine active substance.

While in the foregoing specification this invention has been described in considerable detail and specific embodiments thereof have been set forth, it will be apparent to those skilled in the art that the invention is capable of other embodiments and that many of the details set forth can be varied considerably without departing from the basic principles of the invention.

I claim:

1. The method of enhancing the effectiveness of a 2-mercaptoimidazole compound when orally administered to meat-producing ruminants for promoting growth and feed utilization, said compound being selected from the group consisting of 2-mercaptoimidazole and 1-alkyl 2-mercaptoimidazole wherein the alkyl group contains from 1 to 5 carbon atoms, said 2-mercaptoimidazole compound being administered in amounts from 10 to 150 mg. per 100 pounds of body weight per 24 hours, comprising also orally administering to said ruminants a thyroxine-active material in an amount providing from .0002 to .0025 mg. of thyroxine activity per milligram of said 2-mercaptoimidazole compound administered during each 24 hour period.

2. The method of enhancing the effectiveness of a 2-mercaptoimidazole compound when orally administered to beef cattle for promoting growth and feed utilization, said compound being selected from the group consisting of 2-mercaptoimidazole and 1-alkyl 2-mercaptoimidazoles wherein the alkyl group contains from 1 to 5 carbon atoms, the 2-mercaptoimidazole compound being administered in amounts of from 25 to 100 mg. per 100 pounds of body weight per 24 hours, comprising orally administering to said ruminants a thyroxine-active material in an amount providing from .0005 to .0025 mg. of thyroxine activity per milligram of said 2-mercaptoimidazole compound administered during each 24 hour period.

3. The method of claim 1 in which said 2-mercaptoimidazole compound is 1-methyl 2-mercaptoimidazole and in which said thyroxine-active material is a thyroprotein.

4. The method of claim 2 in which said 2-mercaptoimidazole compound is 1-methyl 2-mercaptoimidazole and in which said thyroxine-active material is thyroprotein.

5. A composition for promoting the growth and feed utilization of meat-producing ruminants, comprising a ruminant feed material containing in combination a thyroxine-active material and a 2-mercaptoimidazole compound, said compound being selected from the group consisting of 2-mercaptoimidazole and 1-alkyl 2-mercaptoimidazoles, wherein the alkyl group contains from 1 to 5 carbon atoms, said composition containing from .0002 to .0025 mg. of thyroxine activity per milligram of 2-mercaptoimidazole compound.

6. The composition of claim 5 in which said thyroxine-active material is a thyroprotein and in which 2-mercaptoimidazole compound is 1-methyl 2-mercaptoimidazole.

7. A composition for promoting the growth and feed utilization of meat-producing ruminants, comprising a ruminant feed material containing in combination a thyroxine-active material, a 2-mercaptoimidazole compound and true vitamin A, said 2-mercaptoimidazole compound being selected from the group consisting of 2-mercaptoimidazole and 1-alkyl 2-mercaptoimidazoles wherein the alkyl group contains from 1 to 5 carbon atoms, said composition containing from .0002 to .0025 mg. of thyroxine activity and from 2 to 450 I.U. of said vitamin A per milligram of said 2-mercaptoimidazole compound.

8. The composition of claim 7 in which said 2-mercaptoimidazole compound is 1-methyl 2-mercaptoimidazole and in which said thyroxine-active material is a thyroprotein.

9. A composition for promoting the growth and feed utilization of meat-producing ruminants, comprising a ruminant feed material containing in combination a thyroxine-active material, true vitamin A, and 1-methyl 2-mercaptoimidazole, said composition containing from .0005 to .0025 mg. of thyroxine activity and from 6 to 120 I.U. of said vitamin A per milligram of said 1-methyl 2-mercaptoimidazole.

References Cited by the Examiner

UNITED STATES PATENTS 2,591,107    4/1952    Turner et al. _____ 99—2

OTHER REFERENCES

Burroughs et al., Science, 128, p. 147 (1958).
Burroughs et al., J. Animal Science 19, 465–9 (1960).

A. LOUIS MONACELL, *Primary Examiner.*